(12) United States Patent
Markovich et al.

(10) Patent No.: US 10,822,437 B2
(45) Date of Patent: *Nov. 3, 2020

(54) POLYETHYLENE COMPOSITION AND PROCESS FOR POLYMERIZING THE SAME

(71) Applicant: Dow Global Technologies LLC, Midland, MI (US)

(72) Inventors: Ronald P. Markovich, Houston, TX (US); Robert J. Jorgensen, Scott Depot, VA (US)

(73) Assignee: Dow Global Technologies LLC, Midland, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/352,303

(22) Filed: Mar. 13, 2019

(65) Prior Publication Data

US 2019/0211121 A1 Jul. 11, 2019

Related U.S. Application Data

(60) Continuation of application No. 15/790,394, filed on Oct. 23, 2017, now Pat. No. 10,273,320, which is a division of application No. 14/900,445, filed as application No. PCT/US2014/043757 on Jun. 24, 2014, now abandoned.

(60) Provisional application No. 61/841,323, filed on Jun. 29, 2013.

(51) Int. Cl.
*C08F 110/02* (2006.01)
*C08F 210/16* (2006.01)
*C08F 4/655* (2006.01)

(52) U.S. Cl.
CPC .......... *C08F 110/02* (2013.01); *C08F 210/16* (2013.01)

(58) Field of Classification Search
CPC ....... C08F 110/02; C08F 210/16; C08F 4/655
See application file for complete search history.

(56) References Cited

U.S. PATENT DOCUMENTS

| 4,302,565 A | 11/1981 | Goeke et al. |
| 4,482,687 A | 11/1984 | Noskay et al. |
| 4,508,842 A | 4/1985 | Beran et al. |
| 4,990,479 A | 2/1991 | Ishimaru et al. |

(Continued)

FOREIGN PATENT DOCUMENTS

CN 101072800 A 11/2007

OTHER PUBLICATIONS

"Ethylene Polymers, LDPE", Encyclopedia of Polymer Science and Technology, Ethylene Polymers, HDPE, vol. 2, pp. 412-441, 2001.

(Continued)

*Primary Examiner* — Catherine S Branch
(74) *Attorney, Agent, or Firm* — Dinsmore & Shohl LLP

(57) ABSTRACT

The instant invention provides a polyethylene composition and process for polymerizing the same.

The polyethylene composition according to the present invention comprises the polymerization reaction of ethylene and optionally one or more α-olefin comonomers in the presence of a catalyst system, wherein said polyethylene composition comprises at least 2 or more molecular weight distributions, measured via triple detector GPC low angle laser light scattering (GPC-LALLS), described in further details hereinbelow, wherein each molecular weight distribution has a peak, and wherein measured detector response of peak 1 divided by the measured detector response of peak 2 is in the range of from 0.50 to 0.79, for example from 0.55 to 0.77.

5 Claims, 6 Drawing Sheets

(56) References Cited

U.S. PATENT DOCUMENTS

| | | |
|---|---|---|
| 5,122,494 A | 6/1992 | Job |
| 5,290,745 A | 3/1994 | Jorgensen et al. |
| 6,187,866 B1 | 2/2001 | Jorgensen et al. |
| 2004/0259723 A1 | 12/2004 | Wagner et al. |
| 2007/0073010 A1 | 3/2007 | Pannell et al. |
| 2008/0125553 A1 | 5/2008 | Conrad et al. |
| 2012/0116022 A1 | 5/2012 | Lynch et al. |

OTHER PUBLICATIONS

EP Office Action pertaining to Appliaction No. 14742038.4 dated Feb. 5, 2016.
EP Response to Office Action dated Aug. 8, 2016 pertaining to EP Application No. 14742038.4.
PCT Search Report pertaining to Application No. PCT/US2014/043757 dated Sep. 17, 2004.
PCT IPRP pertaining to Application No. PCT/US2014/043757 dated Dec. 29, 2015.
China Office Action pertaining to Application No. 201480035237.1 dated Feb. 27, 2017.
EP Examination Report pertaining to Application No. 14742038.4 dated Sep. 8, 2017.
GC Examination Report pertaining to Application No. GC2014-27437 dated Apr. 30, 2017.

POLYETHYLENE COMPOSITION AND PROCESS FOR POLYMERIZING THE SAME

CROSS-REFERENCE TO RELATED APPLICATIONS

This application is filed as a divisional of U.S. application Ser. No. 14/900,445 filed on Dec. 21, 2015, which is a national stage entry of PCT/US2014/043757 file on Jun. 24, 2014, which claims priority to U.S. Provisional Application Ser. No. 61/841,323 filed on Jun. 29, 2013, all of which are incorporated herewith.

FIELD OF INVENTION

The instant invention relates to a polyethylene composition and process for polymerizing the same.

BACKGROUND OF THE INVENTION

The use of Ziegler-Natta catalyst systems to promote various olefin polymerizations is well known. These catalyst systems typically include a catalyst precursor comprising one or more of each of a transition metal, an electron donor or ligand and a cocatalyst. Complete or near complete activation of the precursor is necessary in order to obtain the high-level of catalyst activity required for a commercial olefin polymerization process. Catalyst activation can consist of multiple steps which may include chlorination, reduction reactions, displacement of internal electron donors or ligands and other chemical modifications to the catalyst precursor that are necessary to obtain high levels of catalyst productivity. Other catalyst attributes are also affected by the catalyst activation process; such as stereoregulation (for propylene and butene polymerization), molecular weight distribution, comonomer incorporation and the like. It is well known in the art that these key catalyst attributes are affected by a number of variables, including the method of catalyst manufacture or formation, the use of internal electron donors, the chemical composition of the internal electron donor, the use of external electron donors and the amount of the electron donors present.

Activation of the catalyst precursor requires the removal of the internal electron donor from the vicinity of the active site, i.e., the metal, and, if necessary, reduction of the metal. The activator extracts the internal electron donor compound from the active site in one of several ways. The internal donor can be removed by complex formation, typically with a Lewis Acid, or by alkylation or by reduction and alkylation if the valence state of the metal requires reduction. Typical activating compounds are Lewis Acids.

Activation of the catalyst precursor may occur by (i) full activation in the polymerization reactor by the cocatalyst, (ii) partial activation before introduction of the precursor into the reactor and completion of the activation in the reactor by means of the cocatalyst, or (iii) full activation prior to introduction of the precursor into the reactor. There are several advantages and disadvantages to all three techniques.

Complete activation of the catalyst inside the polymerization reactor typically requires a substantial excess of activator compound and in the case of higher ($C_3$, $C_4$ and up) olefin polymerizations, use of excess selectivity control agent. Advantages to this technique are its simplicity of catalyst manufacture and feed. However, excess activator compound is not only an added operational expense, but it may cause operational problems or detriment to the final product. In addition, there is no way to modify the catalyst composition in an on-line fashion to significantly affect the polymerization response.

Partial activation of the catalyst precursor outside of the reactor requires additional process steps and equipment followed by final activation in the reactor (which, again, requires the use of excessive amounts of activator). Partial activation outside of the reactor also results in the need to store the partially activated catalyst and the likelihood of catalyst deactivation during storage, either due to continued reactions with the activator compounds and their reaction products or due to impurities invariably present in inert gases (such as nitrogen) typically used to blanket these catalysts during storage. Although the formulation of the catalyst may be changed in the partial activation procedure external to the reactor, this again results in a static catalyst formulation. Any polymerization response changes can only come from changing the catalyst batch. Currently, there is no on-line control technique available for fine control of the molecular weight distribution of desired polymers.

SUMMARY OF THE INVENTION

The instant invention provides a polyethylene composition and process for polymerizing the same.

In one embodiment, the instant invention provides a polyethylene composition comprising the polymerization reaction product of ethylene and optionally one or more α-olefin comonomers in the presence of a catalyst system, wherein said polyethylene composition comprises at least 2 or more molecular weight distributions, measured via triple detector GPC low angle laser light scattering (GPC-LALLS), wherein each molecular weight distribution has a peak, and wherein measured detector response of peak 1 divided by the measured detector response of peak 2 is in the range of from 0.50 to 0.79, for example, from 0.55 to 0.77.

In an alternative embodiment, the instant invention further provides a process for polymerizing a polyethylene composition comprising the steps of:

(A) Preparing a slurry of a precursor and a viscous inert liquid, said slurry having a viscosity of at least about 500 cp, the precursor comprising (i) a ligand; (ii) a transition metal; and (iii) a first Lewis Base;

(B) Contacting the slurry of (A) with a first Lewis Acid such that at least a portion of the Lewis Base is complexed with the Lewis Acid wherein the Lewis Acid has the formula $MR_nX_{(m-n)}$, M is Al, B or Si, R is a C1 to C14 alkyl or aryl radical, X is Cl, Br or I, m+n satisfies the valency of the metal M, n is 0 to 3;

(C) Contacting the slurry of (B) with a second different Lewis Acid with the formula $MR_nX_{(m-n)}$, M is Al, or B, R is a C1 to C14 alkyl or aryl radical, X is Cl, Br or I, m+n satisfies the valency of the metal M, n is 0 to 2;

(D) Feeding the slurry of (C) into a gas phase reactor in which an olefin polymerization reaction is in progress in the presence of optionally one or more cocatalysts and wherein the molar ratios of Lewis Acid 1 and Lewis Acid 2 to the electron donor are controlled to affect specific fractions of the molecular weight distribution of the final polymer product;

(E) Where both the relative ratio of Lewis Acid (1) and Lewis Acid (2) to internal electron donor and the chemical identity of Lewis Acid (1) and (2) is adjusted to polymerize said polyethylene composition, wherein said polyethylene composition comprises at least 2 or more molecular weight distributions, measured via triple detector GPC low angle laser light scattering (GPC-LALLS), wherein each molecular weight distribution has a peak, and wherein measured detector response of peak 1 divided by the measured detector response of peak 2 is in the range of from 0.50 to 0.79.

In another alternative embodiment, the instant invention further provides an article comprising the inventive polyethylene composition.

In an alternative embodiment, the instant invention provides an article, in accordance with any of the preceding embodiments, except that the article is produced via rotational molding, thermoforming, blow molding, or injection molding.

In an alternative embodiment, the instant invention provides a process for polymerizing a inventive polyethylene composition, in accordance with any of the preceding embodiments, except that the process occurs in a single gas phase reactor, or a dual gas phase reactor.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

DETAILED DESCRIPTION OF THE INVENTION

Figure 1:
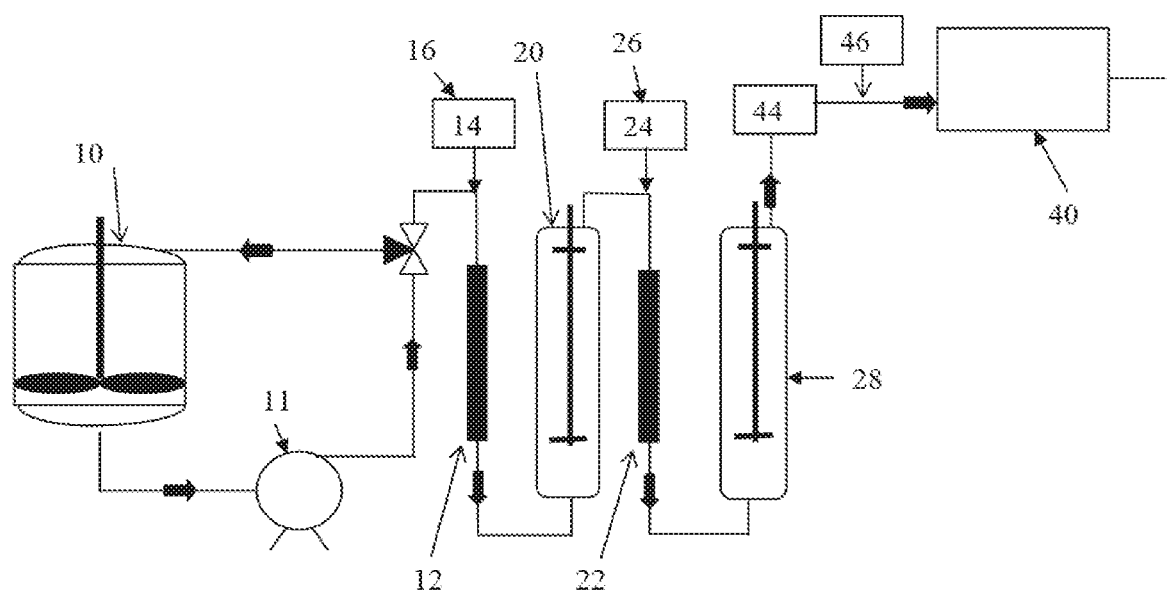
FIG. 1 shows a schematic flow chart of on-line in-line catalyst activation system.

The instant invention provides a polyethylene composition and process for polymerizing the same.

The polyethylene composition according to the present invention comprises the polymerization reaction of ethylene and optionally one or more α-olefin comonomers in the presence of a catalyst system, wherein said polyethylene composition comprises at least 2 or more molecular weight distributions, measured via triple detector GPC low angle laser light scattering (GPC-LALLS), described in further details hereinbelow, wherein each molecular weight distribution has a peak, and wherein measured detector response of peak 1 divided by the measured detector response of peak 2 is in the range of from 0.50 to 0.79, for example from 0.55 to 0.77.

The process for polymerizing a polyethylene composition according to the present invention comprises the steps of:

(A) Preparing a slurry of a precursor and a viscous inert liquid, said slurry having a viscosity of at least about 500 cp, the precursor comprising (i) a ligand; (ii) a transition metal; and (iii) a first Lewis Base;

(B) Contacting the slurry of (A) with a first Lewis Acid such that at least a portion of the Lewis Base is complexed with the Lewis Acid wherein the Lewis Acid has the formula $MR_nX_{(m-n)}$, M is Al, B or Si, R is a C1 to C14 alkyl or aryl radical, X is Cl, Br or I, m+n satisfies the valency of the metal M, n is 0 to 3;

(C) Contacting the slurry of (B) with a second different Lewis Acid with the formula $MR_nX_{(m-n)}$, M is Al, or B, R is a C1 to C14 alkyl or aryl radical, X is Cl, Br or I, m+n satisfies the valency of the metal M, n is 0 to 2;

(D) Feeding the slurry of (C) into a gas phase reactor in which an olefin polymerization reaction is in progress optionally in the presence of one or more cocatalyst and wherein the molar ratios of Lewis Acid 1 and Lewis Acid 2 to the electron donor are controlled to affect specific fractions of the molecular weight distribution of the final polymer product;

(E) Where both the relative ratio of Lewis Acid (1) and Lewis Acid (2) to internal electron donor and the chemical identity of Lewis Acid (1) and (2) is adjusted to polymerize said polyethylene composition, wherein said polyethylene composition comprises at least 2 or more molecular weight distributions, measured via triple detector GPC low angle laser light scattering (GPC-LALLS), wherein each molecular weight distribution has a peak, and wherein measured detector response of peak 1 divided by the measured detector response of peak 2 is in the range of from 0.50 to 0.79, for example from 0.55 to 0.77.

In another alternative embodiment, the instant invention further provides an article comprising the inventive polyethylene composition.

In an alternative embodiment, the instant invention provides an article, in accordance with any of the preceding embodiments, except that the article is produced via rotational molding, thermoforming, blow molding, or injection molding.

In an alternative embodiment, the instant invention provides a process for polymerizing a inventive polyethylene composition, in accordance with any of the preceding embodiments, except that the process occurs in a single gas phase reactor, or a dual gas phase reactor.

According to the invention, a slurry of a precursor and a viscous inert liquid, said slurry having a viscosity of at least about 500 cp is prepared. Within the scope of the present application, the term "precursor" denotes a compound comprising a ligand, a transition metal, and a first Lewis Base. Such precursor catalysts are commonly referred to as Ziegler-Natta catalysts. Suitable Zeigler-Natta catalysts are known in the art and include, for example, the catalysts taught in U.S. Pat. Nos. 4,302,565; 4,482,687; 4,508,842; 4,990,479; 5,122,494; 5,290,745; and, 6,187,866 B1, the disclosures of which are hereby incorporated by reference, to the extent that they disclose such catalysts.

The transition metal compound of the precursor composition can comprise compounds of different kinds. The most usual are titanium compounds—organic or inorganic—having an oxidation degree of 3 or 4. Other transition metals such as, vanadium, zirconium, hafnium, chromium, molybdenum, cobalt, nickel, tungsten and many rare earth metals are also suitable for use in Ziegler-Natta catalysts. The transition metal compound is usually a halide or oxyhalide, an organic metal halide or purely a metal organic compound. In the last-mentioned compounds, there are only organic ligands attached to the transition metal.

The precursor can have the formula $Mg_d\ Me(OR)_e X_f(ED)_g$ wherein R is an aliphatic or aromatic hydrocarbon radical having 1 to 14 carbon atoms or COR' wherein R' is a aliphatic or aromatic hydrocarbon radical having 1 to 14 carbon atoms; each OR group is the same or different; X is independently chlorine, bromine or iodine; ED is an electron donor; d is 0.5 to 56; e is 0, 1, or 2; f is 2 to 116; and g is >1 to 20. Me is a transition metal selected from the group of titanium, zirconium, hafnium and vanadium. Some specific examples of suitable titanium compounds are: $TiCl_3$, $TiCl_4$, $Ti(OC_2H_5)_2Br_2$, $Ti(OC_6H_5)Cl_3$, $Ti(OCOCH_3)Cl_3$, Ti(acetylacetonate)$_2Cl_2$, $TiCl_3$(acetylacetonate), and $TiBr_4$. $TiCl_3$ and $TiCl_4$ are preferred titanium compounds.

The magnesium compounds include magnesium halides such as $MgCl_2$, $MgBr_2$, and $MgI_2$. Anhydrous $MgCl_2$ is a preferred compound. Other compounds useful in the invention are $Mg(OR)_2$, $Mg(OCO_2Ethyl)$ and MgRCl where R is defined above. About 0.5 to about 56, and preferably about 1 to about 20, moles of the magnesium compounds are used per mole of transition metal compound. Mixtures of these compounds may also be used.

The precursor compound can be recovered as a solid using techniques known in the art, such as precipitation of the precursor or by spray drying, with or without fillers. Spray drying is a particularly preferred method for recovery of the precursor compound.

Spray drying process is disclosed in U.S. Pat. No. 5,29,0745 and is incorporated by reference. A further precursor comprising magnesium halide or alkoxide, a transition metal halide, alkoxide or mixed ligand transition metal compound an electron donor and optionally a filler can prepared by spray drying a solution of said compounds from an electron donor solvent.

The electron donor is typically an organic Lewis base, liquid at temperatures in the range of about 0° C. to about 200° C., in which the magnesium and transition metal compounds are soluble. The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. For ethylene homo and co-polymerization, the most preferred electron donor is tetrahydrofuran. Other examples of suitable electron donors are methyl formate, ethyl acetate, butyl acetate, ethyl ether, dioxane, di-n-propyl ether, dibutyl ether, ethanol, 1-butanol, ethyl formate, methyl acetate, ethyl anisate, ethylene carbonate, tetrahydropyran, and ethyl propionate.

While an excess of electron donor may be used initially to provide the reaction product of transition metal compound and electron donor, the reaction product finally contains about 1 to about 20 moles of electron donor per mole of transition metal compound and preferably about 1 to about 10 moles of electron donor per mole of transition metal compound.

The ligands comprise halogen, alkoxide, aryloxide, acetylacetonate and amide anions.

The partial activation of the precursor is carried out prior to the introduction of the precursor into the reactor. The partially activated catalyst can function as a polymerization catalyst but at greatly reduced and commercially unsuitable catalyst productivity. Complete activation by additional cocatalyst is required to achieve full activity. The complete activation occurs in the polymerization reactor via addition of cocatalyst.

The inert liquid is typically a mineral oil. The slurry prepared from the catalyst and the inert liquid has a viscosity measured at 1 $sec^{-1}$ of at least 500 cp at 20° C. Examples of suitable mineral oils are the Kaydol and Hydrobrite mineral oils from Crompton.

In a preferred mode (referred to as an in-line activation system) shown in FIG. 1, the precursor is introduced into a slurry feed tank 10; the slurry then passes via pump 11 to a first reaction zone 12 immediately downstream of a reagent injection port 14 where the slurry is mixed with the first reagent 16. Optionally, the mixture then passes to a second reaction zone 22 immediately downstream of a second reagent injection port 18 where it is mixed with the second reagent 20 in a second reaction zone 22. While only two reagent injection and reaction zones are shown on the diagram, additional reagent injection zones and reaction zones may be included, depending on the number of steps required to fully activate and modify the catalyst to allow control of the specified fractions of the polymer molecular weight distribution. Means to control the temperature of the catalyst precursor feed tank and the individual mixing and reaction zones are provided.

Each reaction zone is equipped with static mixers. The static mixers are preferably positioned vertically. Acceptable mixing can be provided by a 2-foot (32-element) Kenics™ static mixer typically used in commercial scale aspects of the invention. This low energy mixer functions by constantly dividing the flow and reversing flow directions in a circular pattern in the direction of the flow in the tube associated with the mixer.

Depending on the activator compound used, some reaction time may be required for the reaction of the activator compound with the catalyst precursor. This is conveniently done using a residence time zone, which can consist either of an additional length of slurry feed pipe or an essentially plug flow holding vessel. A residence time zone can be used for both activator compounds, for only one or for neither, depending entirely on the rate of reaction between activator compound and catalyst precursor.

Particularly preferred activator compounds are aluminum alkyls and aluminum alkyl chlorides of the formula $AlR_xCl_y$, where X+Y=3 and y is 0 to 2 and R is a C1 to C14 alkyl or aryl radical. Particularly preferred activator compounds are given in Table 1. In a particularly preferred embodiment, one of the two Lewis acids contains at least one halogen atom.

TABLE 1

| Lewis Acid | Lewis Acid |
| --- | --- |
| Diethylaluminum chloride | Triethylaluminum |
| Ethylaluminum dichloride | Trimethylaluminum |
| di-isobutylaluminum chloride | Triisobutylaluminum |
| dimethylaluminum chloride | Tri-n-hexylaluminum |
| Methylaluminum sesquichloride | Tri-n-octylaluminum |
| Ethylaluminum sesquichloride | Dimethylaluminum chloride |

The entire mixture is then introduced into the reactor 40 where the activation is completed by the cocatalyst. Additional reactors may be sequenced with the first reactor; however catalyst is typically only injected into the first of these linked, sequenced reactors with active catalyst transferred from a first reactor into subsequent reactors as part of the polymerization process.

The cocatalysts, which are reducing agents, conventionally used are comprised of aluminum compounds, but compounds of lithium, sodium and potassium, alkaline earth metals as well as compounds of other earth metals than aluminum are possible. The compounds are usually hydrides, organometal or halide compounds. Conventionally, the cocatalysts are selected from the group comprising Al-trialkyls, Al-alkyl halides, Al-alkoxides and Al-alkoxy halides. In particular, Al-Alkyls and Al-chlorides are used. These compounds are exemplified by trimethyl aluminum, triethyl aluminum, tri-isobutyl aluminum, tri-n-hexyl aluminum, dimethyl aluminum chloride, diethyl aluminum chloride, ethyl aluminum dichloride and diisobutyl aluminum chloride, isobutylaluminum dichloride and the like. Butyl lithium and dibutyl magnesium are examples of useful compounds of other metals.

In a preferred embodiment, to partially activate the catalyst slurry, a solution of Lewis Acid 1 (16) in mineral oil is added as the slurry is being pumped to the reactor at mixing location (14) and through a static mixer (12). This mixture is held in a residence time vessel (20) for roughly 1 to 4 hours, depending on the absolute feed rate of the catalyst.

Sequentially, then a solution of Lewis Acid 2 in mineral oil is added (26) at mixing location (24) and through a static mixer (22) to residence time vessel (28) and the mixture is held for roughly 1 to 4 hours. The partially activated catalyst then exits the second residence time vessel and goes directly into the polymerization reactor (40). A flow aid (46) which comprises nitrogen, a hydrocarbon or a combination of the two can be used to carry the catalyst into the polymerization reactor where it is fully activated with a final amount of cocatalyst.

The polyethylene compositions according to the present invention comprise at least 2 or more molecular weight distributions, measured via triple detector GPC low angle laser light scattering (GPC-LALLS), wherein each molecular weight distribution has a peak, and wherein measured detector response of peak 1 divided by the measured detector response of peak 2 is in the range of from 0.50 to 0.79. Such polyethylene compositions can be formed into various articles via any conventional known methods, such as rotational molding, thermoforming, blow molding, or injection molding. Such articles can be used as tanks, e.g. water tanks, fuel tanks and the like, toys, recreational articles, e.g. boats, canoes, kayaks, and the like.

EXAMPLES

The following examples illustrate the present invention but are not intended to limit the scope of the invention. The examples of the instant invention demonstrate that the inventive polyethylene compositions have enhanced processability while facilitating improved properties in the final products.

Inventive Catalyst $J_{1-14}$ and Comparative Catalyst $J_{a-m}$

Inventive Catalyst $J_{1-14}$ and Comparative Catalyst $J_{a-m}$ were prepared according to the following process, based on the formulation components listed below.

Catalyst Precursor Preparation

Preparation of the solid catalyst precursor:
The solid catalyst precursor is prepared essentially according to the process described in example 1 parts (a) and (b) of U.S. Pat. No. 5,290,745.

The solid catalyst precursor is prepared in two stages. First, a slurry is produced, and then the slurry is spray dried to obtain the solid catalyst precursor.

Granulated magnesium metal having a particle size of 0.1 millimetres to 4 millimetres is added under nitrogen to an excess of tetrahydrofuran at a temperature of 50° C. such that the weight ratio of magnesium to tetrahydrofuran of about 1:800. Titanium (IV) chloride is added to the mixture in a mole ratio of magnesium to titanium of 1:2. The mixture temperature is allowed to rise over a period of 3 hours to a temperature of 72° C. The reaction mixture is then held at 70° C. for a further 4 hours. At the end of this time magnesium dichloride is added so that the ratio of magnesium to titanium in the mixture rises to about 5:1. The mixture is held at 70° C. for about 8 hours. The mixture is then filtered through a 100 micrometre filter to remove impurities present in the magnesium chloride.

CAB-O-SIL TS-610 fumed silica (available from Cabot Corporation) acting as an inert filler is then added under nitrogen to the filtered mixture over a period of two hours, the resulting slurry being stirred by means of a turbine agitator for several hours thereafter to thoroughly disperse the fumed silica. The slurry is then sprayed dried under nitrogen at an outlet gas temperature of ~140 to 160° C. in a closed cycle spray dryer equipped with a rotary atomizer. The rotary atomizer speed is adjusted to give solid catalyst precursor particles with a median diameter, $D_{50}$, of 23 to 27 micrometres. The recycle gas flow rate is in the range of 15-25 kg gas/kg of slurry feed. The spray dried catalyst precursor contains ~2.2 to 2.5 weight percent Ti, Mg/Ti molar ratio of ~5.5 to 6 and 25 to 30 weight percent Tetrahydrofuran electron donor. The discrete catalyst precursor particles are mixed with mineral oil under a nitrogen atmosphere in a 400 liter vessel equipped with a turbine agitator to form a slurry containing approximately 28 weight percent of the solid catalyst precursor.

Catalyst Precursor Partial Pre-activation

Two separate pre-activation methods were used in the examples, batch pre-activation, or the more preferred in-line system, which allows for the greatest flexibility in adjusting the pre-activation.

i) Batch Pre-activation

The catalyst precursor slurry was added to a mixing vessel. An appropriate amount of pre-activation agent (Lewis Acid (1), also dissolved in mineral oil, is then added to the catalyst slurry ratioed to the amount of residual electron donor remaining in the catalyst precursor. The slurry was mixed for a minimum of one hour at a temperature of ~35° C. The second Lewis Acid (2) is then added to the slurry, mixed and held for approximately 1 hour at a temperature of ~35° C. All operations are carried out under high purity nitrogen atmosphere to prevent contamination of the pre-activated catalyst system. The slurry was maintained under a nitrogen atmosphere at temperatures in the 25° C. range to minimize deactivation upon storage. The catalyst slurry may be used immediately in polymerization.

Batch pre-activation is used only for the inventive examples produced in pilot scale reactors, i.e. at polymer production rates of 15 to 30 kg/hr. Use of the more preferred in-line system is not feasible due to the very small flow rates of catalyst slurry (i.e. from 1 to 10 cc/hr of total catalyst flow) into the reactor which would require precise control of very low liquid feed levels of the Lewis Acid components.

ii) In-Line Pre-Activation

The in line pre-activation system as described below:

(A) Preparing a slurry of a precursor and a viscous inert liquid, said slurry having a viscosity of at least about 500 cp, the precursor comprising (i) a ligand; (ii) a transition metal; and (iii) a first Lewis Base;

(B) Contacting the slurry of (A) with a first Lewis Acid such that at least a portion of the Lewis Base is complexed with the Lewis Acid wherein the Lewis Acid has the formula $MR_nX_{(m-n)}$, M is Al, B or Si, R is a C1 to C14 alkyl or aryl radical, X is Cl, Br or I, m+n satisfies the valency of the metal M, n is 0 to 3;

(C) Contacting the slurry of (B) with a second different Lewis Acid with the formula $MR_nX_{(m-n)}$, M is Al, or B, R is a C1 to C14 alkyl or aryl radical, X is Cl, Br or I, m+n satisfies the valency of the metal M, n is 0 to 2;

(D) Feeding the slurry of (C) into a gas phase reactor.

The activator compounds were of the same concentration and type as those used for batch pre-activation, as described above.

Inventive PE Examples 1-14 and Comparative PE Examples 1-13

Inventive PE Examples 1-14 and Comparative PE Examples 1-13 were prepared according to the following process based on the reaction conditions listed below in Table 2-6. Inventive PE Examples 1-14 and Comparative PE Examples 1-13 were tested for their properties and results are reported below in Table 2-7.

Polymerization Process

Products produced in pilot scale utilized the batch pre-activation process, as described above. Polymerization was conducted using a single polymerization with a 14 inch diameter straight side, a nominal 5 to 6 foot bed height using a fluidization gas velocity of about 1.6 to 2.0 feet/sec. Reactor polymerization conditions are given in the Tables 2-4. Triethylaluminum was used as cocatalyst.

Products from commercial scale reactors utilized the in-line pre-activation process, as described above. Commercial scale reactors range from 12 to 18 feet in diameter with bed height in the 50 to 60 foot range. Polymerization rates ranged from 20,000 to 50,000 kg/hr. Reactor polymerization conditions are given in the Tables 5-6. Triethylaluminum was used as cocatalyst.

The precursors used contained 2.2 to 2.5 wt % Titanium, had a Mg/Ti mole ratio of 5.5 to 6 and a Tetrahydrofuran content of 26 to 30 wt %. Precursor particle D50 was 23 to 25 microns and D10 was 8 to 10 microns.

Comparative 1-6, 8, and 10-13 were all obtained from commercial scale reactors using the in line pre-activation system. In all cases, the catalyst was a 4520 (0.45 moles of DEAC added per mole of THF in the catalyst precursor and 0.2 moles of TnHAL added per mole of THF in the precursor). TnHAL was used as a 45 to 50 wt % solution in Hydrobrite 380 mineral oil, DEAC was used as a 13 wt % solution in the same mineral oil. Pre-activation temperature was maintained at 35 to 40° C. Typical reaction conditions are given in Table 5.

Inventive 1, 2, 5 and 7 to 9 were also produced in a commercial reactor using the same catalyst precursor formulation with different catalyst pre-activation parameters. Catalyst pre-activation parameters were identical. Tri-n-hexyl Aluminum was added at a 0.2 to 1 molar ratio to the Tetrahydrofuran in the precursor composition in the first stage of the in-line preactivation system and diethylaluminum chloride in the second stage at a 0.7 to 1 molar ratio. TnHAL was used as a 45 to 50 wt % solution in Hydrobrite 380 mineral oil, DEAC was used as a 13 wt % solution in the same mineral oil. Preactivation temperature was maintained at 35 to 40° C. Typical reaction conditions are given in Table 6.

TABLE 2

|  | Comparative 9 | Inventive 12 | Inventive 11 |
| --- | --- | --- | --- |
| Lewis Acid 1 | TnHAL | TnHAL | TnHAL |
| Lewis Acid 2 | DEAC | DEAC | DEAC |
| CATALYST | 4520 ($J_i$) | J4535 ($J_{12}$) | J5535 ($J_{11}$) |
| Reactor Temp. ° C. | 95.0 | 95.0 | 95.0 |
| Pressure, psig | 347.0 | 347.3 | 347.7 |
| C2 Part. Pressure, psi | 124.9 | 124.9 | 160.0 |
| H2/C2 Molar Ratio | 0.2011 | 0.2602 | 0.2425 |
| C6/C2 Molar Ratio | 0.0361 | 0.0361 | 0.0370 |
| Isopentane mol % | 12.3 | 12.3 | 12.4 |
| Production Rate pph | 47.00 | 53.89 | 51.89 |
| Residence Time, hr | 3.64 | 2.88 | 3.08 |
| SGV (ft/sec) | 1.70 | 1.66 | 1.65 |
| RESIN PROPERTIES |  |  |  |
| Melt Index $I_2$ | 1.91 | 1.93 | 1.83 |
| Density, g/cm3 | 0.9432 | 0.9423 | 0.9423 |

TABLE 3

|  | Inventive 14 | Inventive 13 | Inventive 10 |
| --- | --- | --- | --- |
| Lewis Acid 1 | TEAL | TnHAL | TEAL |
| Lewis Acid 2 | DEAC | DEAC | DEAC |
| CATALYST | J4520 ($J_{14}$) | J7020 ($J_{13}$) | J7020 ($J_{10}$) |
| Temp. ° C. | 95.0 | 95.0 | 95.0 |
| Pressure, psig | 347.7 | 347.9 | 347.9 |
| C2 Part. Pressure, psi | 125.0 | 124.9 | 125.0 |
| H2/C2 Molar Ratio | 0.2549 | 0.2562 | 0.2476 |
| C6/C2 Molar Ratio | 0.0354 | 0.0368 | 0.0365 |
| Isopentane mol % | 12.4 | 12.4 | 12.0 |
| Production Rate pph | 59.33 | 51.89 | 46.83 |
| Residence Time, hr | 1.74 | 2.82 | 2.78 |
| SGV (ft/sec) | 1.67 | 1.65 | 1.69 |
| RESIN PROPERTIES |  |  |  |
| Melt Index $I_2$ | 1.91 | 1.97 | 1.83 |
| Density, g/cm3 | 0.9418 | 0.9400 | 0.9399 |

TABLE 4

|  | Comparative 7 | Inventive 3 and 4[1] | Inventive 6 |
| --- | --- | --- | --- |
| Lewis Acid 1 | TnHAL | TnHAL | TEAL |
| Lewis Acid 2 | DEAC | DEAC | DEAC |
| CATALYST | J4520 ($J_g$) | J7020 ($J_{3-4}$) | J7020 ($J_6$) |
| Temp. ° C. | 95.0 | 95.0 | 95.0 |
| Pressure, psig | 347.9 | 348.2 | 348.2 |
| C2 Part. Pressure, psi | 125.0 | 150.0 | 150.1 |
| H2/C2 Molar Ratio | 0.2346 | 0.2566 | 0.2565 |
| C6/C2 Molar Ratio | 0.0390 | 0.0384 | 0.0382 |
| Isopentane mol % | 12.0 | 11.5 | 11.5 |
| Production Rate | 46.57 | 45.52 | 43.25 |
| Residence Time, hr | 3.19 | 3.25 | 3.64 |
| SGV (ft/sec) | 1.77 | 1.73 | 1.71 |
| RESIN PROPERTIES |  |  |  |
| Melt Index $I_2$ | 1.96 | 1.99 | 1.95 |
| Density, g/cm$^3$ | 0.9421 | 0.9414 | 0.9417 |

[1]Two different samples were obtained from this particular trial and both were evaluated to demonstrate the reproducibility of the method.

TABLE 5

| | Catalyst Type | |
|---|---|---|
| | J4520 | J4520 |
| REACTION CONDITIONS | | |
| Temp. ° C. | 92 to 95 | 92 to 95 |
| Pressure, kPA | Average of 2250 | Average of 2250 |
| C2 Part. Pressure, kPA | 850 to 900 | 850 to 900 |
| H2/C2 Molar Ratio | 0.24 to 0.25 | ~0.22 |
| C6/C2 Molar Ratio | 0.055 to 0.06 | ~0.04 |
| Isopentane mol % | 7 to 10 | 7 to 10 |

TABLE 5-continued

| | Catalyst Type | |
|---|---|---|
| | J4520 | J4520 |
| Production Rate, T/hr | 35 to 50 | 35 to 50 |
| Residence Time, hr | 1.5 to 2 | 1.5 to 2 |
| % Condensing | >10 | >10 |
| SGV (m/s) | 0.65 to 0.7 | 0.65 to 0.7 |
| RESIN PROPERTIES | | |
| Melt Index $I_2$ | ~5.2 | ~2.0 |
| Density, g/cm3 | ~0.9350 | ~0.942 |

TABLE 6

| | Catalyst Type | |
|---|---|---|
| | 7020 | 7020 |
| REACTION CONDITIONS | | |
| Temp. ° C. | 92 to 95 | 92 to 95 |
| Pressure, kPA | Average of 2250 | Average of 2250 |
| C2 Part. Pressure, kPA | 900 to 1000 | 900 to 1000 |
| H2/C2 Molar Ratio | 0.24 to 0.25 | ~0.22 |
| C6/C2 Molar Ratio | 0.055 to 0.06 | ~0.04 |

TABLE 6-continued

| | Catalyst Type | |
|---|---|---|
| | 7020 | 7020 |
| Isopentane mol % | 7 to 10 | 7 to 10 |
| Production Rate, T/hr | 35 to 50 | 35 to 50 |
| Residence Time, hr | 1.5 to 2 | 1.5 to 2 |
| % Condensing | >10 | >10 |
| SGV (m/s) | 0.65 to 0.7 | 0.65 to 0.7 |
| RESIN PROPERTIES | | |
| Melt Index $I_2$ | ~5.2 | ~2.0 |
| Density, g/cm3 | ~0.9350 | ~0.942 |

TABLE 7

| Density | MI | Peak Height 1 | Peak Height 2 | Peak 1 Height Ratio | Catalyst | Description |
|---|---|---|---|---|---|---|
| 0.9420 | 2.00 | 0.000003175 | 0.000003244 | 0.9789 | $J_a$ | Comparative 1 |
| 0.9420 | 2.00 | 0.000003154 | 0.000003251 | 0.9702 | $J_b$ | Comparative 2 |
| 0.9420 | 2.00 | 0.090878256 | 0.097696759 | 0.9302 | $J_c$ | Comparative 3 |
| 0.9420 | 2.00 | 0.092373677 | 0.099709436 | 0.9264 | $J_d$ | Comparative 4 |
| 0.9420 | 2.00 | 0.092574991 | 0.099986590 | 0.9259 | $J_e$ | Comparative 5 |
| 0.9420 | 2.00 | 0.090345763 | 0.098084159 | 0.9211 | $J_f$ | Comparative 6 |
| | | 0.090396605 | 0.099728718 | 0.9064 | $J_g$ | Comparative 7 |
| 0.9420 | 2.00 | 0.000003009 | 0.000003321 | 0.9060 | $J_h$ | Comparative 8 |
| | | 0.075550072 | 0.083887450 | 0.9006 | $J_i$ | Comparative 9 |
| 0.9379 | 5.20 | 0.000002055 | 0.000002305 | 0.8913 | $J_j$ | Comparative 10 |
| 0.9350 | 5.20 | 0.000002118 | 0.000002420 | 0.8751 | $J_K$ | Comparative 11 |
| 0.9350 | 5.20 | 0.000002106 | 0.000002426 | 0.8681 | $J_l$ | Comparative 12 |
| 0.9350 | 5.20 | 0.000002129 | 0.000002462 | 0.8648 | $J_m$ | Comparative 13 |
| 0.9350 | 5.20 | 0.000001773 | 0.000002307 | 0.7684 | $J_1$ | Inventive 1 |
| 0.9350 | 5.20 | 0.000001837 | 0.000002442 | 0.7524 | $J_2$ | Inventive 2 |
| | | 0.000002475 | 0.000003303 | 0.7493 | $J_3$ | Inventive 3 |
| | | 0.072100000 | 0.097072303 | 0.7427 | $J_4$ | Inventive 4 |
| 0.9350 | 5.20 | 0.000001818 | 0.000002452 | 0.7415 | $J_5$ | Inventive 5 |
| | | 0.072100000 | 0.100488424 | 0.7175 | $J_6$ | Inventive 6 |
| 0.9350 | 5.20 | 0.000001693 | 0.000002410 | 0.7027 | $J_7$ | Inventive 7 |
| 0.9350 | 5.20 | 0.000001617 | 0.000002386 | 0.6775 | $J_8$ | Inventive 8 |
| 0.9350 | 5.20 | 0.000001625 | 0.000002407 | 0.6750 | $J_9$ | Inventive 9 |
| | | 0.055371292 | 0.084573112 | 0.6547 | $J_{10}$ | Inventive 10 |
| | | 0.053466156 | 0.084165521 | 0.6353 | $J_{11}$ | Inventive 11 |
| | | 0.052961685 | 0.085543230 | 0.6191 | $J_{12}$ | Inventive 12 |
| | | 0.052469008 | 0.086796120 | 0.6045 | $J_{13}$ | Inventive 13 |
| | | 0.048503831 | 0.084443480 | 0.5744 | $J_{14}$ | Inventive 14 |

Test Methods

Test methods include the following:

Density is measured in accordance with ASTM D-792.

Melt index $I_2$ measurements are performed according to ASTM D-1238, Condition 190° C./2.16 kilogram (kg). Melt index is reported as g/10 minutes.

Triple Detector GPC (RAD GPC)

A high temperature Triple Detector Gel Permeation Chromatography (3D-GPC) system equipped with Robotic Assistant Delivery (RAD) system for sample preparation and sample injection. The concentration detector is an Infra-red concentration detector (IR4 from Polymer Char, Valencia, Spain), which was used to determine the molecular weight and molecular weight distribution. Other two detectors are a Precision Detectors (Agilent) 2-angle laser light scattering detector, Model 2040, and a 4-capillary differential viscometer detector, Model 150R (Malvern). The 15° angle of the light scattering detector was used for calculation purposes.

Data collection was performed using Polymer Char DM 100 Data acquisition box. The carrier solvent was 1,2,4-trichlorobenzene (TCB). The system was equipped with an on-line solvent degas device from Agilent. The column compartment was operated at 150° C. The columns were four Mixed ALS 30 cm, 20 micron columns. The samples were prepared at 2.0 mg/mL using RAD system. The chromatographic solvent (TCB) and the sample preparation solvent contained 200 ppm of butylated hydroxytoluene (BHT) and both solvent sources were nitrogen sparged. Polyethylene samples were stirred gently at 150° C. for 3 hours. The injection volume was 200 μl, and the flow rate was 1.0 ml/minute.

Data was processed using in-house software. Calibration of the GPC columns was performed with 21 narrow molecular weight distribution polystyrene standards. The molecular weights of the standards ranged from 580 to 8,400,000 g/mol, and were arranged in 6 "cocktail" mixtures, with at least a decade of separation between individual molecular weights.

The polystyrene standard peak molecular weights were converted to polyethylene molecular weights using the following equation (as described in T. Willams and I. M. Ward, J. Polym. Sci., Polym. Let., 6, 621 (1968)):

$$M_{polyethylene} = A(M_{polystyrene})^B \quad (1)$$

Here B has a value of 1.0, and the experimentally determined value of A is 0.38.

A first order polynomial was used to fit the respective polyethylene-equivalent calibration points obtained from equation (1) to their observed elution volumes. The actual polynomial fit was obtained so as to relate the logarithm of polyethylene equivalent molecular weights to the observed elution volumes (and associated powers) for each polystyrene standard.

Number, weight, and z-average molecular weights were calculated according to the following equations:

$$\overline{Mn} = \frac{\sum_i Wf_i}{\sum_i (Wf_i / M_i)} \quad (2)$$

$$\overline{Mw} = \frac{\sum_i (Wf_i * M_i)}{\sum_i Wf_i} \quad (3)$$

$$\overline{Mz} = \frac{\sum_i (Wf_i * M_i^2)}{\sum_i (Wf_i * M_i)} \quad (4)$$

Where, $Wf_i$ is the weight fraction of the i-th component and $M_i$ is the molecular weight of the i-th component.

The MWD was expressed as the ratio of the weight average molecular weight (Mw) to the number average molecular weight (Mn).

The A value was determined by adjusting A value in equation (1) until Mw, the weight average molecular weight calculated using equation (3) and the corresponding retention volume polynomial, agreed with the independently determined value of Mw obtained in accordance with the linear homopolymer reference with known weight average molecular weight of 115,000 g/mol.

The Systematic Approach for the determination of each detector offset was implemented in a manner consistent with that published by Balke, Mourey, et. al . (T. H. Mourey and S. T. Balke, in "*Chromatography of Polymers (ACS Symposium Series, #521)*", T. Provder Eds., An American Chemical Society Publication, 1993, Chpt 12, p. 180; S. T. Balke, R. Thitiratsakul, R. Lew, P. Cheung, T. H. Mourey, in "*Chromatography of Polymers (ACS Symposium Series, #521)*", T. Provder Eds., An American Chemical Society Publication, 1993, Chpt 13, p. 199), using data obtained from the three detectors while analyzing the broad linear polyethylene homopolymer (115,000 g/mol) and the narrow polystyrene standards. The Systematic Approach was used to optimize each detector offset to give molecular weight results as close as possible to those observed using the conventional GPC method. The overall injected concentration, used for the determinations of the molecular weight and intrinsic viscosity, was obtained from the sample infra-red area, and the infra-red detector calibration (or mass constant) from the linear polyethylene homopolymer of 115,000 g/mol. The chromatographic concentrations were assumed low enough to eliminate addressing 2nd Virial coefficient effects (concentration effects on molecular weight).

The absolute molecular weight was calculated use the 15° laser light scattering signal and the IR concentration detector, $M_{PE,i,abs} = K_{LS}*(LS_i)/(IR_i)$, using the same $K_{LS}$ calibration constant as in equation 8A. The paired data set of the $i^{th}$ slice of the IR response and LS response was adjusted using the determined off-set as discussed in the Systematic Approach.

In addition to the above calculations, a set of alternative Mw, Mz and $M_{z+1}$ [Mw (abs), Mz (abs), Mz (BB) and $M_{z+1}$ (BB)] values were also calculated with the method proposed by Yau and Gillespie,(W. W. Yau and D. Gillespie, Polymer, 42, 8947-8958 (2001)), and determined from the following equations:

$$\overline{Mw}(abs) = K_{LS} * \frac{\sum_i (LS_i)}{\sum_i (IR_i)} \quad (5)$$

where, $K_{LS}$=LS-MW calibration constant. As explained before, the response factor, $K_{LS}$, of the laser detector was determined using the certificated value for the weight average molecular weight of NIST 1475 (52,000 g/mol).

$$\overline{Mz}(abs) = \frac{\sum_i IR_i * (LS_i / IR_i)^2}{\sum_i IR_i * (LS_i / IR_i)} \quad (6)$$

$$\overline{Mz}(BB) = \frac{\sum_i (LS_i * M_i)}{\sum_i (LS_i)} \quad (7)$$

$$\overline{M_{Z+1}}(BB) = \frac{\sum_i (LS_i * M_i^2)}{\sum_i (LS_i * M_i)} \quad (8)$$

where $LS_i$ is the 15 degree LS signal, and the M, uses equation 2, and the LS detector alignment is as described previously.

In order to monitor the deviations over time, which may contain an elution component (caused by chromatographic changes) and a flow rate component (caused by pump changes), a late eluting narrow peak is generally used as a "flow rate marker peak". A flow rate marker was therefore established based on a decane flow marker dissolved in the eluting sample prepared in TCB. This flow rate marker was used to linearly correct the flow rate for all samples by alignment of the decane peaks.

Procedure for Determining the GPC LALLS Peak Ratio

Figure 4:
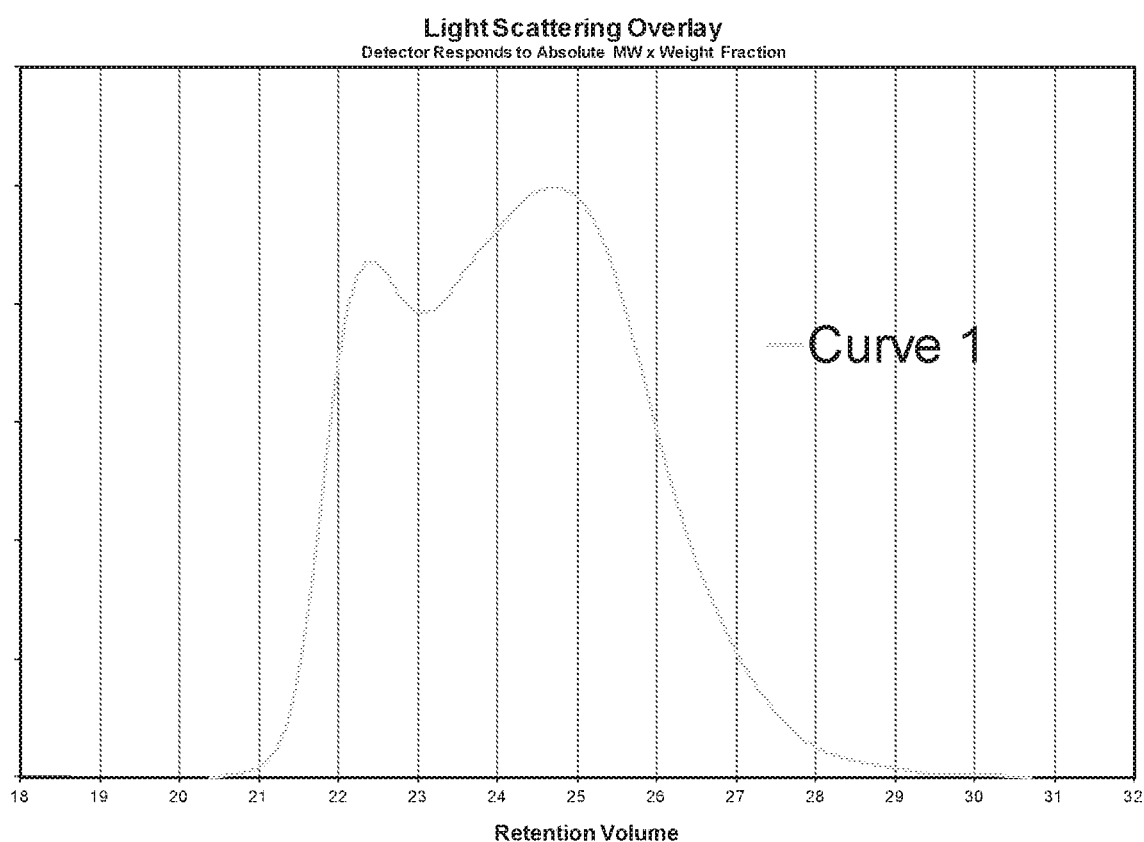
FIG. 4 is a gel permeation chromatography (GPC) low angle laser light scattering (LALLS) scan in which the molecular weight distribution is measured, intensity versus retention volume.
Figure 5:
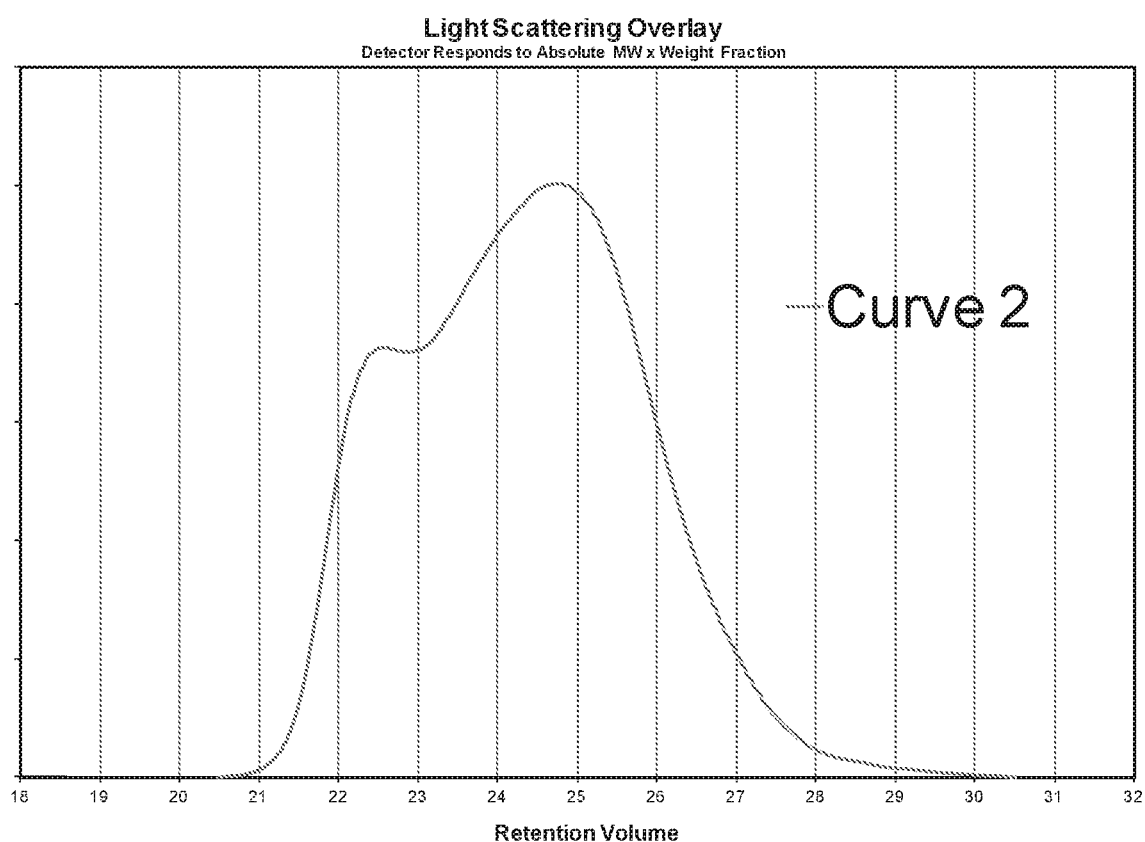
FIG. 5 a GPC-LALLS scan in which the molecular weight distribution is measured, intensity versus retention volume.
Figure 6:
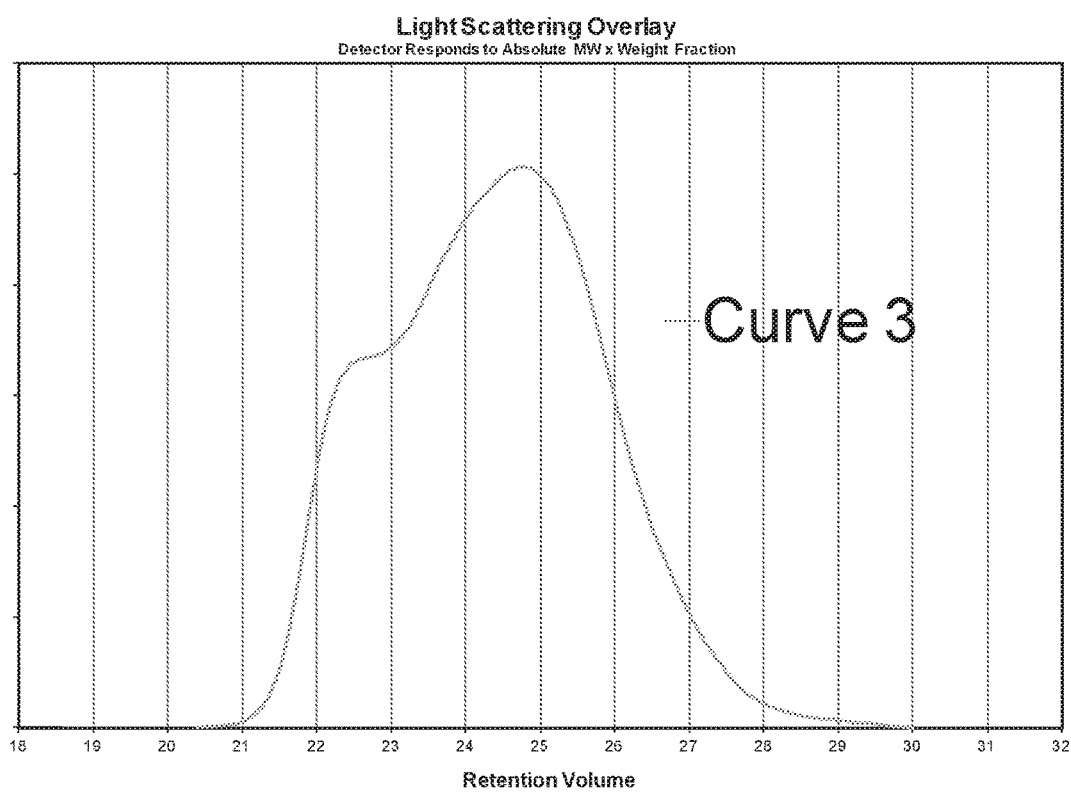
FIG. 6 a GPC-LALLS scan in which the molecular weight distribution is measured, intensity versus retention volume.

Obtain graphical and tabulated output data from GPC LALLS analysis. Using the graphical output, identify the narrow elution volume ranges that bracket or contain the peaks observed on the curve. Each graph in FIG. 4 and FIG. 5 illustrates GPC LALLS curves with two distinct peaks. For each peak, one can assign an elution volume range that brackets or contains the peak. In these illustrations, the areas of the peak can be contained within one elution volume. For each graph in FIG. 4 and FIG. 5, the left peak is contained between 22 and 23 Elution Volumes. The right peak is contained within 24.5 to 25.5 Elution Volumes. For convention, the highest molecular weight peak is designated Peak 1. The lower molecular weight peak is designated Peak 2. Each graph in FIG. 4, FIG. 5, and FIG. 6 shows that the molecular weight decreases with increasing elution volume. For these curves Peak 2, the lower molecular weight peak will be to the right of Peak 1.

There were instances when Peak 1 was not a not a distinct peak but rather a shoulder. The graph in FIG. 6 illustrates a curve with a shoulder. However, one experienced in the art could identify a narrow elution volume range that encompasses the shoulder and can be differentiated from Peak 2. In the graph in FIG. 6, Peak 1 can be seen to be within 22 and 23 Elution Volumes. The shoulder area is distinguished by a region proceeding it and following it with steep positive slopes. The region of the shoulder approaches zero slope but does not reach zero. It will stay positive.

Within the region for each of these peaks (or shoulder), determine the minimum positive instantaneous slope and the elution volume where that occurs.

Equation for Determination of the Instantaneous Slope (m) Between GPC LALLS Data Points $$m = \frac{(Yi - Yj)}{(Xi - Xj)}$$

Where Xi is the Elution Volume associated with the ith data point and Xj is the Elution Volume associated with the jth data point and where the ith datapoint is the larger Elution Volume value and where Yi is the GPC LALLS output at Elution Volume Xi and Yj is the GPC LALLS output at Elution Volume Xj.

The ith and jth sets of data points are adjacent data points on the curve or in the tabulated data. If there is noise or scatter in the data that results in discontinuous transitions from positive to negative slope, than those data points should be used in the calculations. Typically smooth continuous regions and transitions are observed.

Figure 2:
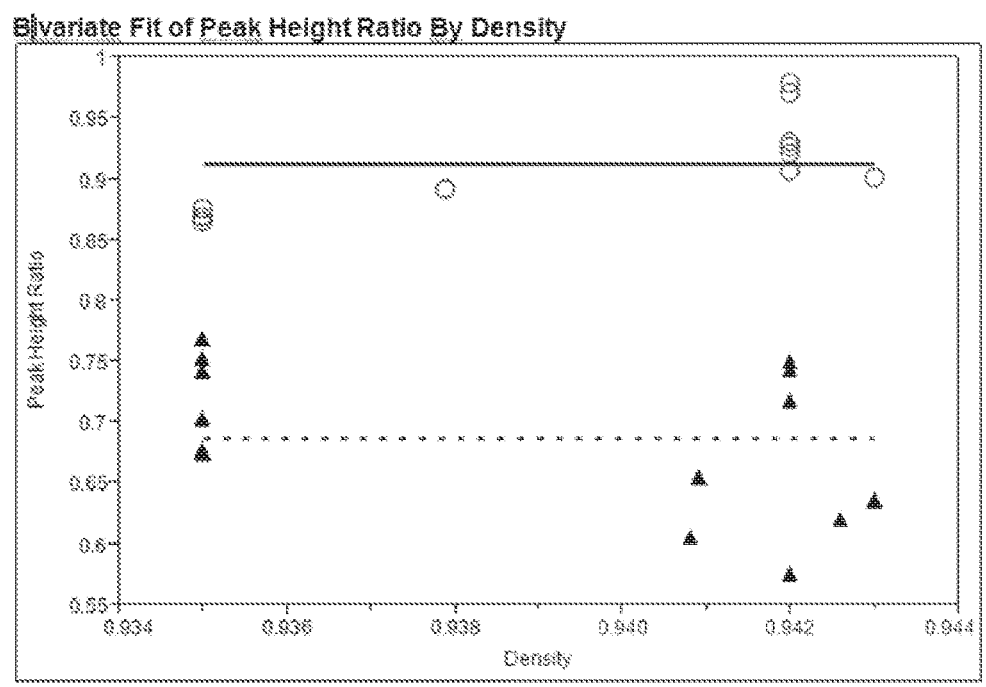
FIG. 2 is a graph illustrating the relationship peak height ratio v. density v. catalyst for Comparative Examples 1-13 and Inventive Examples 1-13.
Figure 3:
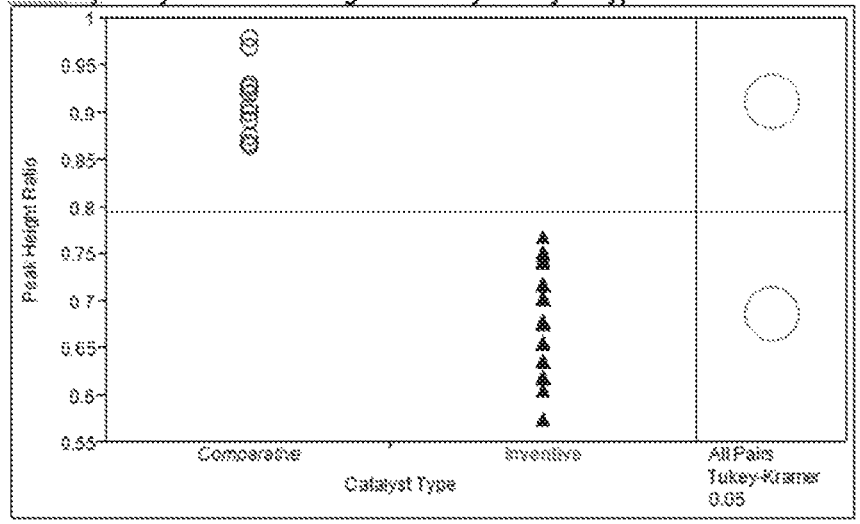
FIG. 3 is a graph illustrating the relationship between the peak height ratio of the Comparative Examples 1-13 and the peak height ratio of the Inventive Examples 1-13.

Once the $m_{ij}$ is calculated for success set of data points within region identifies for each peak; the peak height can be determined for each peak. Within the region for each of these peaks (or shoulder), determine the minimum positive instantaneous slope and the elution volume associated with that point. The Peak Height for that associated peak will be the GPC LALLS recorded output at that Elution Volume. For standard peaks, like that observed in FIGS. 1 and 2, the minimum positive data point will typically be the last positive slope values. It will be followed by a continuous range of negative slope values. For shoulders, such as in FIG. 3, the slopes do not go negative. For shoulders, it is easier to identify a minimum by applying a moving average to the slope values. A guide for the moving average would be to select the number of successive data points so that the span of Elution Volumes would be about one quarter of the Elution Volume range for the shoulder. This approach will allow one to identify and select an Elution Volume and the associated GPC LALLS output. The Peak Height will be the GPC LALLS output associated with the Elution Volume selected. Record the Peak Height associated with Peak 1 and Peak 2. The Peak Height Ratio is calculated as follows:

Peak Height Ratio=$PH1/PH1$

Where PH1 is the GPC LALLS output associated Peak 1 and PH2 is the GPC LALLS output associated Peak 2.

The present invention may be embodied in other forms without departing from the spirit and the essential attributes thereof, and, accordingly, reference should be made to the appended claims, rather than to the foregoing specification, as indicating the scope of the invention.

We claim:

1. A process for polymerizing a polyethylene composition comprising the steps of:
   (A) preparing a slurry of a precursor and a viscous inert liquid, said slurry having a viscosity of at least 500 cp, the precursor a formula MgdMe(OR)eXf(ED)g, wherein R is an aliphatic or aromatic hydrocarbon radical having 1 to 14 carbon atoms or COR' wherein R' is a aliphatic or aromatic hydrocarbon radical having 1 to 14 carbon atoms, each OR group is the same or different; X is independently chlorine, bromine, or iodine; ED is an electron donor comprising an organic Lewis base chosen from an alkyl ester of an aliphatic or aromatic carboxylic acid, an aliphatic ketone, an aliphatic amine, an aliphatic alcohol, an alkyl or cycloalkyl ether, or combination therefore, wherein each electron donor comprises 2 to 20 carbon atoms; d is 0.5 to 56; e is 0, 1, or 2; f is 2 to 116 and g is >1 to 20; Me is a transition metal selected from the group of titanium, zirconium, hafnium, and vanadium;
   (B) contacting the slurry of (A) with a first Lewis Acid such that at least a portion of the organic Lewis Base is complexed with the first Lewis Acid wherein the first Lewis Acid has the formula $MR_nX_{(m-n)}$, M is Al, B or Si, R is a C1 to C14 alkyl or aryl radical, X is Cl, Br or I, m+n satisfies the valency of the metal M, n is 0 to 3;
   (C) contacting the slurry of (B) with a second different Lewis Acid with the formula $MR_nX_{(m-n)}$, M is Al, or B, R is a C1 to C14 alkyl or aryl radical, X is Cl, Br or I, m+n satisfies the valency of the metal M, n is 0 to 2; (D) Feeding the slurry of (C) into a gas phase reactor in which an olefin polymerization reaction is in progress in the presence of one or more cocatalysts and wherein the molar ratios of the first Lewis Acid and second different Lewis Acid to the electron donor are controlled to affect specific fractions of the molecular weight distribution of the final polymer product;
   (E) where both the relative ratio of the first Lewis Acid and second different Lewis Acid to electron donor and the chemical identity of the first Lewis Acid and second different Lewis Acid is adjusted to polymerize said polyethylene composition, wherein said polyethylene composition comprises at least 2 molecular weight distributions, measured via triple detector GPC low angle laser light scattering (GPC LALLS), wherein each molecular weight distribution has a peak, and wherein measured detector response of peak 1 divided by the measured detector response of peak 2 is in the range of from 0.50 to 0.79.

2. The process for polymerizing a polyethylene composition according to claim 1, wherein the electron donor is chosen from alkyl, ether and cycloalkyl ether, wherein the electron donor comprises 2 to 20 carbon atoms.

3. The process for polymerizing a polyethylene composition according to claim 1, wherein the electron donor is chosen from dialkyl ketones, diaryl ketones, or alkylaryl ketones, wherein the electron donor comprises 3 to 20 carbon atoms.

4. The process for polymerizing a polyethylene composition according to claim 1, wherein the electron donor is chosen from alkyl esters, alkoxy esters, or alkylalkoxy esters, wherein each ester is produced from an alkyl carboxylic acid or aryl carboxylic acids, wherein the electron donor 2 to 20 carbon atoms.

5. The process for polymerizing a polyethylene composition according to claim 1, wherein the electron donor is selected from the group consisting of tetrahydrofuran, methyl formate, ethyl acetate, butyl acetate, ethyl ether dioxane, di-n-propyl ether, dibutyl ether ethanol, 1-butanol, ethyl formate, methyl acetate, ethyl anisate, ethylene carbonate, tetrahydropyran, and ethyl propionate.

\* \* \* \* \*